(12) United States Patent
Takahashi et al.

(10) Patent No.: US 9,551,385 B2
(45) Date of Patent: Jan. 24, 2017

(54) MIXER DRUM DRIVING DEVICE WITH AN AUXILIARY HYDRAULIC PUMP TO ROTATE A MIXER DRUM

(75) Inventors: Yoshimitsu Takahashi, Fukaya (JP); Tetsuo Kasahara, Kumagaya (JP); Kazunori Tanaka, Fukaya (JP)

(73) Assignee: KYB Corporation, Tokyo (JP)

( * ) Notice: Subject to any disclaimer, the term of this patent is extended or adjusted under 35 U.S.C. 154(b) by 598 days.

(21) Appl. No.: 14/007,128

(22) PCT Filed: Mar. 21, 2012

(86) PCT No.: PCT/JP2012/057222
§ 371 (c)(1),
(2), (4) Date: Sep. 24, 2013

(87) PCT Pub. No.: WO2012/128291
PCT Pub. Date: Sep. 27, 2012

(65) Prior Publication Data
US 2014/0013736 A1     Jan. 16, 2014

(30) Foreign Application Priority Data
Mar. 24, 2011    (JP) ................................ 2011-065503

(51) Int. Cl.
*B28C 5/42*     (2006.01)
*F16D 33/00*    (2006.01)

(52) U.S. Cl.
CPC .............. *F16D 33/00* (2013.01); *B28C 5/4213* (2013.01); *F15B 2211/20515* (2013.01);
(Continued)

(58) Field of Classification Search
CPC .......... B28C 5/42; B28C 5/4203; B28C 5/421; B28C 5/4213; B28C 5/1856; B28C 5/4217; B28C 5/422; B60P 3/16; F16D 33/00; F15B 2211/20523; F15B 2211/30505; F15B 2211/2654; F15B 2211/20576; F15B 2211/20515; F15B 2211/7058
(Continued)

(56) References Cited

U.S. PATENT DOCUMENTS 2,676,003 A * 4/1954 Foster ................... B28C 5/4213
180/53.4
2,968,915 A * 1/1961 Feistel, Jr. ............ B28C 5/4213
366/54
(Continued)

FOREIGN PATENT DOCUMENTS

JP    55-163303 A    12/1980
JP    60-39001 A     9/1985
(Continued)

OTHER PUBLICATIONS

International Search Report and Written Opinion corresponding to PCT/JP2012/057222, dated Jun. 12, 2012.
(Continued)

*Primary Examiner* — Charles Cooley
(74) *Attorney, Agent, or Firm* — Hauptman Ham, LLP

(57) ABSTRACT

A mixer drum driving device includes a mixer drum, a hydraulic motor, a hydraulic pump, an auxiliary hydraulic pump for rotating the mixer drum for mixing by supplying pressure oil to the hydraulic motor independently of the hydraulic pump, and a direct-current brush motor for driving and rotating the auxiliary hydraulic pump. The auxiliary hydraulic pump is driven and rotated by the direct-current brush motor when the engine stops during the rotation of the mixer drum for mixing.

5 Claims, 4 Drawing Sheets

(52) U.S. Cl.
CPC ........... *F15B 2211/20523* (2013.01); *F15B 2211/20576* (2013.01); *F15B 2211/2654* (2013.01); *F15B 2211/30505* (2013.01); *F15B 2211/7058* (2013.01)

(58) Field of Classification Search
USPC .................................. 366/53–63, 232–233
See application file for complete search history.

(56) References Cited

U.S. PATENT DOCUMENTS

| | | | | |
|---|---|---|---|---|
| 3,053,044 A * | 9/1962 | Gresty | B28C 5/4213 | 60/486 |
| 3,136,165 A * | 6/1964 | Pitts | B28C 5/421 | 366/188 |
| 3,160,398 A * | 12/1964 | Green | B28C 5/4213 | 366/61 |
| 3,225,543 A * | 12/1965 | Vivier | B28C 5/4213 | 60/328 |
| 3,391,537 A * | 7/1968 | Smith, Jr. | B28C 5/4213 | 60/422 |
| 3,603,084 A * | 9/1971 | Okazaki | B28C 5/4213 | 60/389 |
| 3,767,171 A * | 10/1973 | Dunmire | B28C 5/4272 | 366/30 |
| 4,097,925 A * | 6/1978 | Butler, Jr. | B28C 5/4213 | 366/2 |
| 4,542,990 A * | 9/1985 | Fouquet | B28C 5/4213 | 180/14.2 |
| 4,585,355 A * | 4/1986 | Waitzinger | B28C 5/4213 | 366/108 |
| 4,585,356 A * | 4/1986 | Hudelmaier | B60P 3/16 | 180/53.8 |
| 4,786,179 A * | 11/1988 | Kaminski | B28C 5/38 | 106/271 |
| 5,076,703 A * | 12/1991 | Loefke | B28C 5/4213 | 220/563 |
| 5,348,387 A * | 9/1994 | Gordon | B28C 5/4217 | 366/60 |
| 5,746,509 A * | 5/1998 | Gebhard | B28C 5/421 | 366/61 |
| 6,074,083 A * | 6/2000 | Gebhard | F16H 61/4165 | 366/61 |
| 6,923,566 B2 * | 8/2005 | Willbee, Jr. | B28C 5/4213 | 366/61 |
| 6,942,375 B2 * | 9/2005 | Chanasyk | B28C 5/4213 | 366/61 |
| 7,222,753 B2 * | 5/2007 | Hayduk | B29B 7/7663 | 222/145.5 |
| 7,896,538 B2 * | 3/2011 | Wright | B28C 5/4213 | 180/53.4 |
| 8,104,947 B2 * | 1/2012 | Ando | B28C 5/4213 | 366/54 |
| 8,616,758 B2 * | 12/2013 | Takahashi | B28C 5/4213 | 366/61 |
| 8,864,364 B2 * | 10/2014 | Zenne | B60P 3/16 | 366/44 |
| 8,926,164 B2 * | 1/2015 | Kamijo | B28C 5/422 | 366/61 |
| 9,346,186 B2 * | 5/2016 | Takahashi | B28C 5/4213 | |
| 9,409,313 B2 * | 8/2016 | Shimizu | B28C 5/422 | |
| 2002/0014496 A1 * | 2/2002 | Cline | B01F 5/0615 | 222/1 |
| 2002/0191481 A1 * | 12/2002 | Cox | B01F 13/0035 | 366/16 |
| 2003/0223304 A1 * | 12/2003 | Willbee, Jr. | B28C 5/4213 | 366/61 |
| 2004/0081014 A1 * | 4/2004 | Chanasyk | B28C 5/4213 | 366/61 |
| 2005/0199210 A1 * | 9/2005 | Biess | F01M 5/021 | 123/179.19 |
| 2006/0028913 A1 * | 2/2006 | Haskell | B01F 9/0016 | 366/224 |
| 2006/0030032 A1 * | 2/2006 | Zhang | B01F 15/065 | 435/287.2 |
| 2007/0263478 A1 * | 11/2007 | Burch | B28C 5/4213 | 366/61 |
| 2007/0280035 A1 * | 12/2007 | Abe | B28C 5/4213 | 366/31 |
| 2008/0008025 A1 * | 1/2008 | Abe | B28C 5/4213 | 366/61 |
| 2008/0134674 A1 * | 6/2008 | Geissler | F16H 61/40 | 60/464 |
| 2008/0198686 A1 * | 8/2008 | Wright | B28C 5/4213 | 366/61 |
| 2009/0152744 A1 * | 6/2009 | Mou | B01F 7/1625 | 261/84 |
| 2009/0282824 A1 * | 11/2009 | Ando | B28C 5/4213 | 60/449 |
| 2013/0000293 A1 * | 1/2013 | Dybing | F16H 61/4148 | 60/327 |
| 2013/0111892 A1 * | 5/2013 | Takahashi | B28C 5/4213 | 60/459 |
| 2013/0201780 A1 * | 8/2013 | Liao | B01F 7/00133 | 366/65 |
| 2013/0214716 A1 * | 8/2013 | Barfus | A47J 43/08 | 318/434 |
| 2013/0276577 A1 * | 10/2013 | Kroschel | B28C 5/4213 | 74/665 B |
| 2014/0010035 A1 * | 1/2014 | Takahashi | B28C 5/4217 | 366/61 |
| 2014/0010036 A1 * | 1/2014 | Takahashi | B28C 5/4213 | 366/61 |
| 2014/0013736 A1 * | 1/2014 | Takahashi | B28C 5/4213 | 60/428 |
| 2014/0015315 A1 * | 1/2014 | Takahashi | B28C 5/4213 | 307/10.1 |
| 2014/0198599 A1 * | 7/2014 | Kamijo | B28C 5/422 | 366/61 |
| 2015/0047335 A1 * | 2/2015 | Takahashi | F16H 61/4139 | 60/428 |
| 2015/0217481 A1 * | 8/2015 | Takahashi | B28C 5/4213 | 366/61 |
| 2016/0250774 A1 * | 9/2016 | Takahashi | B28C 5/422 | |

FOREIGN PATENT DOCUMENTS

| | | |
|---|---|---|
| JP | 2003-294008 A | 10/2003 |
| JP | 2003-301802 A | 10/2003 |
| JP | 2007-278430 A | 10/2007 |

OTHER PUBLICATIONS

Office Action issued May 5, 2014, corresponds to New Zealand patent application No. 616173.

* cited by examiner

MIXER DRUM DRIVING DEVICE WITH AN AUXILIARY HYDRAULIC PUMP TO ROTATE A MIXER DRUM

RELATED APPLICATIONS

The present application is a National Phase of International Application Number PCT/JP2012/057222, filed Mar. 21, 2012, and claims priority from Japanese Application Number 2011-065503, filed Mar. 24, 2011.

TECHNICAL FIELD

The present invention relates to a mixer drum driving device.

BACKGROUND ART

A mixer truck carries mortar, ready-mixed concrete and the like (hereinafter, referred to as "fresh concrete") in a mixer drum rotatably mounted on a chassis and transports these from a fresh concrete factory to a construction site.

The mixer truck sets the mixer drum constantly in positive rotation to prevent quality degradation and solidification of the fresh concrete in transporting the fresh concrete. By the positive rotation of the mixer drum, a plurality of spiral blades mounted in the mixer drum constantly keeps mixing the fresh concrete. Further, the mixer truck can discharge the fresh concrete in the mixer drum by setting the mixer drum in negative rotation in a direction opposite to the positive rotation. The mixer truck supplies the fresh concrete to a placement location by setting the mixer drum in negative rotation upon reaching a concrete placement site.

As just described, the mixer truck needs to constantly rotate the mixer drum until the fresh concrete is discharged after being poured into the mixer drum. An engine of the mixer truck is generally used as a drive source used for the rotation of the mixer drum. Specifically, the rotational power of the engine is transmitted to a hydraulic pump via a PTO (Power Take Off), pressure oil discharged from the hydraulic pump is supplied to a hydraulic motor and the mixer drum is driven and rotated by the rotation of the hydraulic motor.

In a mixer drum driving device for driving a mixer drum only by an engine, the rotation speed of the engine needs to be increased particularly in the case of rotating the mixer drum at a high speed. If the rotation speed of the engine is increased, noise is generated and the amount of fuel consumption increases.

Further, since the mixer drum needs to be constantly kept in rotation for reasons such as the prevention of solidification while fresh concrete is carried in the mixer drum, the engine cannot be stopped. Thus, even if the mixer truck arrives at a placement site, the engine needs to continue to be driven although a mixer truck is in park if the mixer truck is waiting to discharge the fresh concrete.

Accordingly, JP2007-278430A discloses a mixer drum driving device for driving and rotating a mixer drum by driving an auxiliary hydraulic pump by a motor in accordance with the drive of the hydraulic pump by an engine.

SUMMARY OF INVENTION

In this mixer drum driving device, the mixer drum is set in positive rotation and negative rotation by driving the auxiliary hydraulic pump by the motor, and the mixing, pouring and discharging of the fresh concrete carried in the mixer drum are all performed by the motor. Thus, an inverter necessary to drive the motor is necessary and, in addition, a high-output motor needs to be used, leading to the enlargement of the motor and a power supply.

Since this increases the number of components for driving the motor and enlarges the motor, the power supply necessary to drive the motor and other components, mountability of the mixer drum onto a chassis is deteriorated and the mixer truck becomes heavier. Thus, the load capacity of the mixer drum has to be reduced and the amount of transportable fresh concrete decreases, thereby deteriorating transportation efficiency. Further, since transportation efficiency is deteriorated, the amount of fuel consumption increases by that much.

An object of the present invention is to provide a mixer drum driving device capable of driving a mixer drum by a motor without reducing transportation efficiency.

According to one aspect of the present invention, a mixer drum driving device comprises a mixer drum rotatably mounted on a chassis of a mixer truck; a hydraulic motor for driving and rotating the mixer drum; a hydraulic pump for supplying pressure oil to the hydraulic motor by being driven by the power of an engine of the mixer truck; an auxiliary hydraulic pump for rotating the mixer drum for mixing by supplying pressure oil to the hydraulic motor independently of the hydraulic pump; and a direct-current brush motor for driving and rotating the auxiliary hydraulic pump, wherein the auxiliary hydraulic pump is driven and rotated by the direct-current brush motor when the engine stops during the rotation of the mixer drum for mixing.

Embodiments of the present invention and advantages thereof are described in detail below with reference to the accompanying drawings.

DESCRIPTION OF EMBODIMENTS

Hereinafter, an embodiment of the present invention is described with reference to the drawings.

Figure 1:
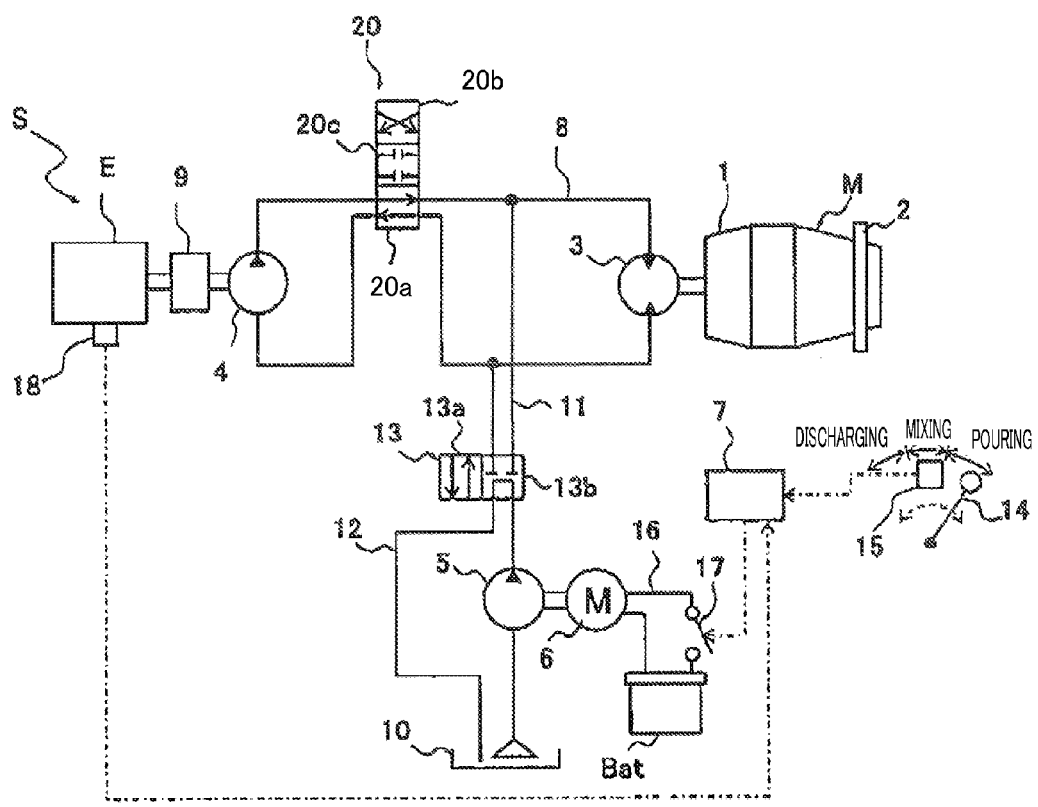
FIG. 1 is a diagram showing a mixer drum driving device in the present embodiment.
Figure 3:
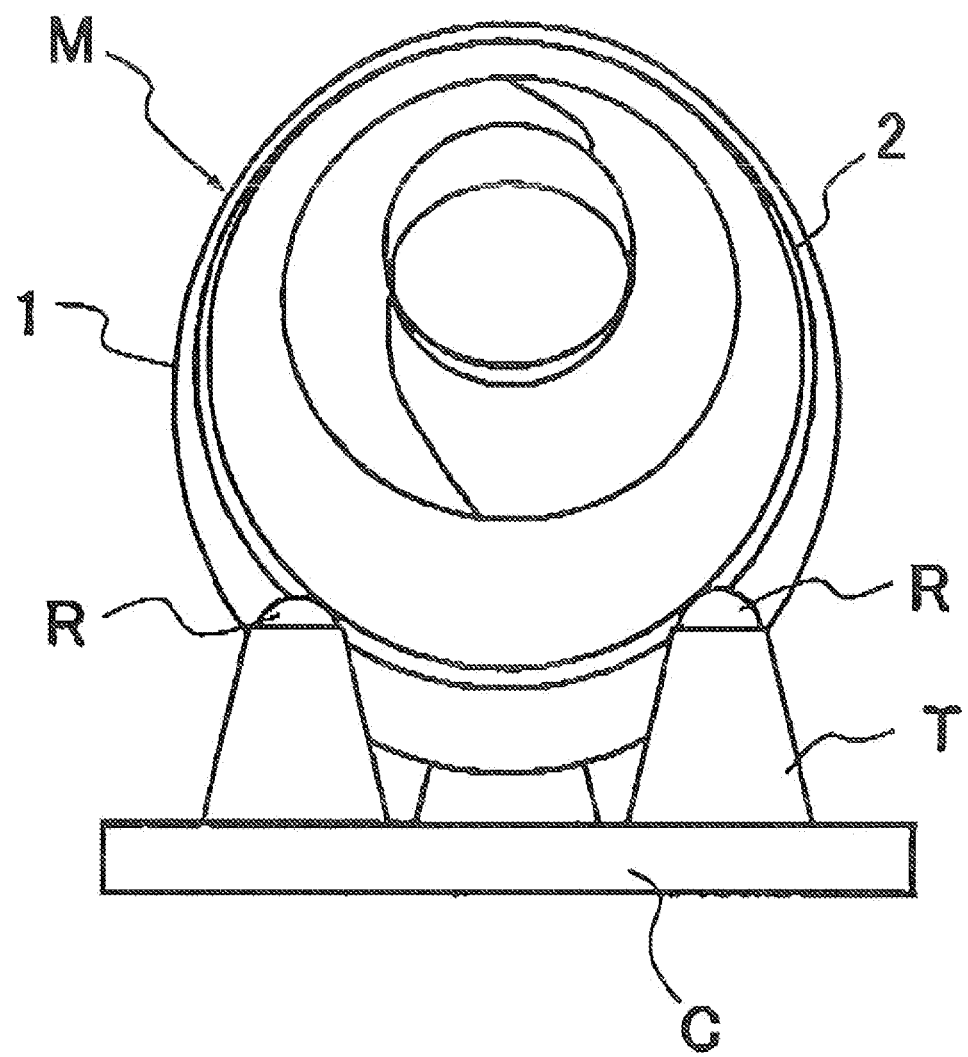
FIG. 3 is a rear view of the mixer drum mounted on the chassis of the mixer truck.

As shown in FIG. 1 and FIG. 3, a mixer drum driving device S in the present embodiment includes a mixer drum M rotatably mounted on a chassis C of a mixer truck V, a hydraulic motor 3 for driving and rotating the mixer drum M, a hydraulic pump 4 for supplying pressure oil to the hydraulic motor 3 by being driven by the power of an engine E of the mixer truck V, an auxiliary hydraulic pump 5 capable of supplying pressure oil to the hydraulic motor 3 independently of the hydraulic pump 4 to rotate the mixer drum M for mixing, a direct-current brush motor 6 for driving and rotating the auxiliary hydraulic pump 5 and a controller 7 for controlling the direct-current brush motor 6.

The mixer truck V includes legs T mounted on the chassis C and a pair of rollers R, R rotatably equipped in the legs T and carries the mixer drum M and the hydraulic motor 3, the hydraulic pump 4, the auxiliary hydraulic pump 5, the direct-current brush motor 6 and the controller 7 necessary to drive and rotate the mixer drum M on the chassis C.

Figure 2:
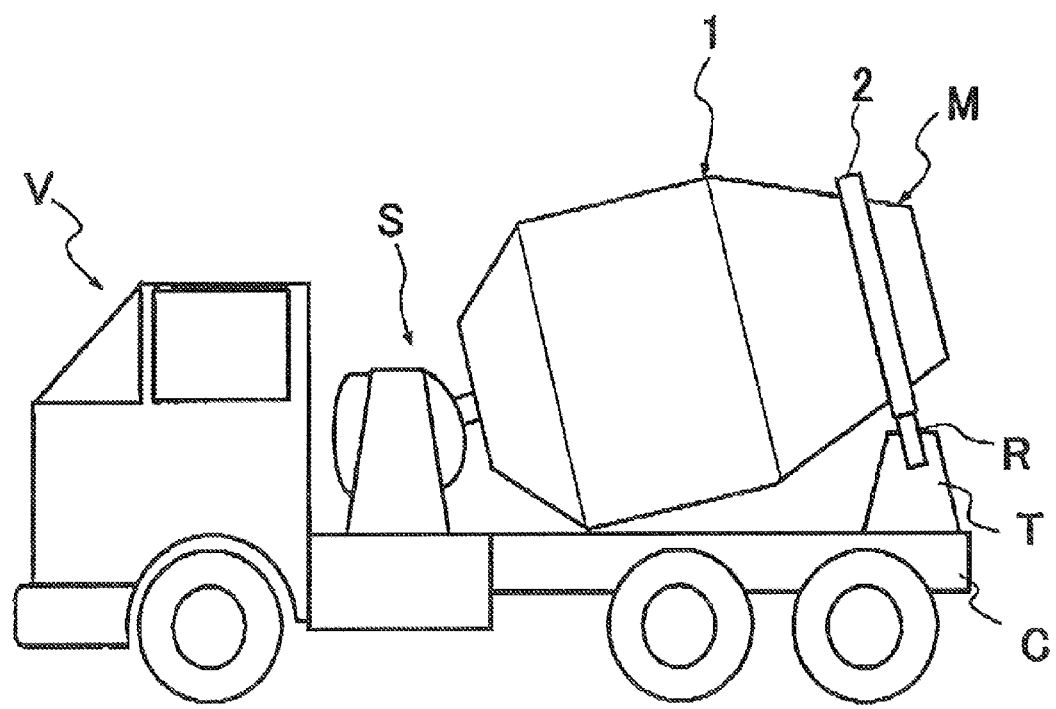
FIG. 2 is a side view of a mixer truck carrying a mixer drum on a chassis.

The mixer drum M includes a drum shell 1 in the form of a bottomed tube with an open rear end and coupled to the hydraulic motor 3 at a shaft center portion of a bottom portion serving as a front end, and a roller ring 2 provided on the outer periphery of the rear end side of the drum shell 1. As shown in FIG. 2 and FIG. 3, the mixer drum M is rotatably mounted on the chassis C to support the roller ring 2 from below by the rollers R, R. Furthermore, the mixer drum M is mounted on the chassis C in a forward inclined posture with the rear end side lifted up.

A plurality of spiral blades is provided on an inner peripheral side of the drum shell 1. By these blades, a load such as fresh concrete carried in the mixer drum M can be mixed while being moved to an inner side if the mixer drum M is set in positive rotation, whereas the load can be moved to the rear end side and discharged from the mixer drum M if the mixer drum M is set in negative rotation. Furthermore, in pouring the fresh concrete into the mixer drum M, the mixer drum M is set in positive rotation at a higher speed than in rotation for mixing.

Accordingly, there are three rotation modes of the mixer drum M: a pouring mode utilized in pouring the load, a mixing mode utilized in mixing the load and a discharging mode utilized in discharging the load. In the mixing mode, the mixer drum M is set in positive rotation at such a low speed as to be able to prevent the solidification of the fresh concrete, e.g. at 1 to 2 rpm to suppress an increase in slump value while preventing the solidification of the fresh concrete.

Although a case where the fresh concrete as the load is transported from a concrete plant to a placement site is described as an example in the present embodiment, the present embodiment is applicable also in a case where cleaning water is poured into the mixer drum M after fresh concrete is discharged at a placement site and the mixer truck returns to a concrete plant while being cleaned. In this case, the cleaning water is a load.

The hydraulic motor 3 is set to be capable of bidirectional rotation and connected to the hydraulic pump 4 via a looped pipe line 8. The hydraulic motor 3 is coupled to the mixer drum M and sets the mixer drum M in positive rotation in the case of positive rotation while setting the mixer drum M in negative rotation in the case of negative rotation. It should be noted that a reduction gear may be interposed between the hydraulic motor 3 and the mixer drum M.

The hydraulic pump 4 is a one-way discharge type hydraulic pump which is provided at an intermediate position of the pipe line 8 and discharges pressure oil toward the hydraulic motor 3, and a variable capacity type hydraulic pump such as a piston pump. The hydraulic pump 4 is coupled to the engine E of the mixer truck V via a PTO 9 and driven and rotated by the power of the engine E.

To bidirectionally rotate the hydraulic motor 3 by the hydraulic pump 4 that discharges the pressure oil in one direction, a switching valve 20 is provided at an intermediate position of the pipe line 8. The switching valve 20 is a 4-port 3-position switching valve having three positions: a position 20a where the pressure oil of the hydraulic pump 4 is fed to the hydraulic motor 3 to set the hydraulic motor 3 in positive rotation, a position 20b where the pressure oil of the hydraulic pump 4 is fed to the hydraulic motor 3 to set the hydraulic motor 3 in negative rotation and a position 20c where the hydraulic motor 3 and the hydraulic pump 4 are disconnected.

It should be noted that the hydraulic pump 4 may be set to be of a bidirectional discharge type. In this case, the hydraulic pump 4 and the hydraulic motor 3 are connected by a looped pipe line without providing the switching valve 20 and the hydraulic motor 3 can be driven and rotated in both positive and negative directions by switching a discharging direction of the hydraulic pump 4.

The auxiliary hydraulic pump 5 is provided at an intermediate position of an auxiliary supply pipe line 11 connecting a side of the pipe line 8 upstream of the hydraulic motor 3 when the hydraulic motor 3 is in positive rotation and a tank 10. Thus, the auxiliary hydraulic pump 5 can suck oil from the tank 10 and supply pressure oil to an upstream side when the hydraulic motor 3 is in positive rotation. It should be noted that a side of the pipe line 8 downstream of the hydraulic motor 3 when the hydraulic motor 3 is in positive rotation is connected to the tank 10 via an auxiliary discharge pipe line 12.

The direct-current brush motor 6 is connected to a power supply Bat to rotate only in one direction. The auxiliary hydraulic pump 5 is driven and rotated by the direct-current brush motor 6 and sucks oil from the tank 10 and discharges it toward the hydraulic motor 3. Further, a switching valve 13 is provided at intermediate positions of the auxiliary supply pipe line 11 and the auxiliary discharge pipe line 12. The switching valve 13 is a 4-port 2-position switching valve having two positions: a position 13a where pressure oil discharged from the auxiliary hydraulic pump 5 is fed to the upstream side of the pipe line 8 when the hydraulic motor 3 is in positive rotation via the auxiliary supply pipe line 11 to set the hydraulic motor 3 in positive rotation and the downstream side of the pipe line 8 when the hydraulic motor 3 is in positive rotation is connected to the tank 10 via the auxiliary discharge pipe line 12 and a position 13b where the auxiliary hydraulic pump 5 is connected to the tank 10 and the pressure oil discharged from the auxiliary hydraulic pump 5 is returned to the tank 10 without via the hydraulic motor 3.

When the direct-current brush motor 6 is driven by power supply from the power supply Bat, the auxiliary hydraulic pump 5 rotates to suck the oil from the tank 10 and discharge the pressure oil. If the switching valve 13 is at the position 13a where the pressure oil is supplied to the hydraulic motor 3, the pressure oil discharged from the auxiliary hydraulic pump 5 is supplied to the hydraulic motor 3 and the hydraulic motor 3 is set in positive rotation.

The mixer drum driving device S in the present embodiment includes a select lever 14 capable of selecting the rotation mode of the mixer drum M. When an operator of the mixer truck V operates the select lever 14, the mixer drum M rotates in the selected rotation mode. Specifically, the operator can select any one of the pouring mode for setting the mixer drum M in positive rotation at a high speed, the mixing mode for setting the mixer drum M in positive rotation at a low speed and the discharging mode for setting the mixer drum M in negative rotation at a high speed by operating the select lever 14 in a direction of a broken-line arrow in FIG. 1.

The select lever 14 is coupled to an unillustrated governor of the engine E via a link or the like and can rotate the mixer drum M at a high speed by increasing the rotation speed of the engine E in the pouring mode and the discharging mode. Further, the select lever 14 can drive an unillustrated actuator such as a solenoid for switching the switching valve 20. In the pouring mode and the mixing mode, the switching valve 20 is switched to the position 20a where the pressure oil is so supplied as to set the hydraulic motor 3 in positive rotation. In the discharging mode, the switching valve 20 is switched to the position 20b where the pressure oil is so supplied as to set the hydraulic motor 3 in negative rotation.

It should be noted that, instead of switching the switching valve 20 by the solenoid, the select lever 14 and the switching valve 20 may be coupled via a link or the like and the switching valve 20 may be switched by the operation of the select lever 14.

When the select lever 14 is set in the mixing mode, an angle of inclination of the hydraulic pump 4 is automatically adjusted so that the discharge flow rate of the hydraulic pump 4 is constant regardless of the rotation speed of the engine E. By the action of this adjusting mechanism, the mixer drum M is set in positive rotation at a constant speed regardless of the rotation speed of the engine E.

The controller 7 is connected to a rotation speed sensor 18 for detecting an engine rotation speed, a proximity switch 15 for outputting an ON-signal when the select lever 14 is located to set the mixing mode and a switch 17 provided at an intermediate position of a power-supply line 16 connecting the power supply Bat and the direct-current brush motor 6. When the select lever 14 is located to set the mixing mode, an ON-signal of the proximity switch 15 is input to the controller 7. The controller 7 recognizes that the mixer drum M is being rotated for mixing by the ON-signal of the proximity switch 15.

Further, the controller 7 recognizes that the engine E is stopped when the engine rotation speed becomes 0. As just described, the controller 7 judges that the mixer drum M is being rotated for mixing and that the engine E is in a stopped state from the ON-signal of the proximity switch 15 and the engine rotation speed detected by the rotation speed sensor 18. It should be noted that the controller 7 only has to be configured so as to be able to make the above judgment and turn on and off the switch 17 by outputting signals to the switch 17. Further, the controller 7 may receive an engine rotation pulse signal or an idling stop signal and judges whether or not the engine is stopped, utilizing at least one of these signals.

The controller 7 performs an ON-operation of the switch 17 when the mixer drum M is being rotated for mixing and the engine E is in the stopped state. This causes power to be supplied from the power supply Bat to the direct-current brush motor 6, whereby the auxiliary hydraulic pump 5 is driven. Thus, the pressure oil supplied from the auxiliary hydraulic pump 5 instead of the hydraulic pump 4 drives the hydraulic motor 3 and the mixer drum M seamlessly continues rotation for mixing.

Specifically, the mixer drum driving device S drives and rotates the mixer drum M only by the direct-current brush motor 6 to rotate the mixer drum M for mixing when the engine E is set in the stopped state. The controller 7 switches the switching valves 13, 20 in addition to the ON-operation of the switch 17. The controller 7 is connected to unillustrated actuators such as solenoids for driving and switching the switching valves 13, 20. In the case of driving and rotating the mixer drum M only by the direct-current brush motor 6, the switching valve 13 is switched to the position 13a where the pressure oil discharged from the auxiliary hydraulic pump 5 is fed to the hydraulic motor 3 and the switching valve 20 is switched to the position 20c where the hydraulic pump 4 is disconnected from the hydraulic motor 3 on a hydraulic circuit. That is, the hydraulic pump 4 and the hydraulic motor 3 are disconnected.

By disconnecting the hydraulic pump 4 from the hydraulic motor 3 in this way, the pressure oil of the auxiliary hydraulic pump 5 can be prevented from flowing toward the hydraulic pump 4 and escaping to the tank 10 via the hydraulic pump 4 and the mixer drum M can be efficiently driven and rotated.

Further, when the engine E is restarted after being stopped during the rotation of the mixer drum M for mixing, the controller 7 turns off the switch 17 to stop the direct-current brush motor 6. Then, the hydraulic motor 3 is driven by the pressure oil supplied from the hydraulic pump 4 driven by the engine E instead of the pressure oil from the auxiliary hydraulic pump 5. In this way, the rotation of the mixer drum M for mixing is seamlessly continued.

In the case of switching the drive source for the mixer drum M from the direct-current brush motor 6 to the engine E, the controller 7 switches the switching valve 20 to the position 20a where the pressure oil is fed to set the hydraulic motor 3 in positive rotation and switches the switching valve 13 to the position 13b where the auxiliary hydraulic pump 5 is disconnected from the hydraulic motor 3 on the hydraulic circuit. This causes the auxiliary hydraulic pump 5 and the hydraulic motor 3 to be disconnected. By disconnecting the auxiliary hydraulic pump 5 from the hydraulic motor 3 in this way, the pressure oil of the hydraulic pump 4 can be prevented from flowing toward the auxiliary hydraulic pump 5 and escaping to the tank 10 via the auxiliary hydraulic pump 5.

The mixer drum driving device S of the present embodiment mixes the fresh concrete in the mixer drum M using the direct-current brush motor 6 only in the state where the engine E is stopped. Since the drum is rotated by the drive of the auxiliary hydraulic pump 5 only for mixing, the rotation speed of the auxiliary hydraulic pump 5 may be unidirectional and constant and the rotation speed of the motor 6 may also be constant.

By doing so, a maximum torque required for a motor can be smaller as compared with the case where all the functions of pouring, mixing and discharging of the mixer drum M are performed only by a motor. Thus, the direct-current brush motor 6 and the power supply Bat can be miniaturized without requiring an inverter.

Accordingly, since the direct-current brush motor 6 and the power supply Bat to be mounted on the chassis C of the mixer truck V can be miniaturized and an inverter is not necessary, a sufficient capacity can be ensured for the mixer drum M. Furthermore, since the mixer truck V becomes lighter in weight, fresh concrete load capacity can be increased by an amount corresponding to a reduction in weight. Thus, the mixer drum M can be driven by a motor without leading to a reduction in transportation efficiency due to a reduction in the amount of transportation of fresh concrete.

Furthermore, since transportation efficiency is not reduced, the amount of fuel consumption of the mixer truck V can be reduced. Further, since the direct-current brush motor 6 and the power supply Bat to be mounted on the chassis C of the mixer truck V can be miniaturized and an inverter is not necessary, manufacturing cost can be reduced.

Furthermore, since a drive system for the mixer drum M is composed of two systems of the engine E and the direct-current brush motor 6, even if a certain trouble occurs in either one of the systems and the mixer drum M cannot be rotated, the mixer drum M can be driven and rotated by the other system.

Figure 4:
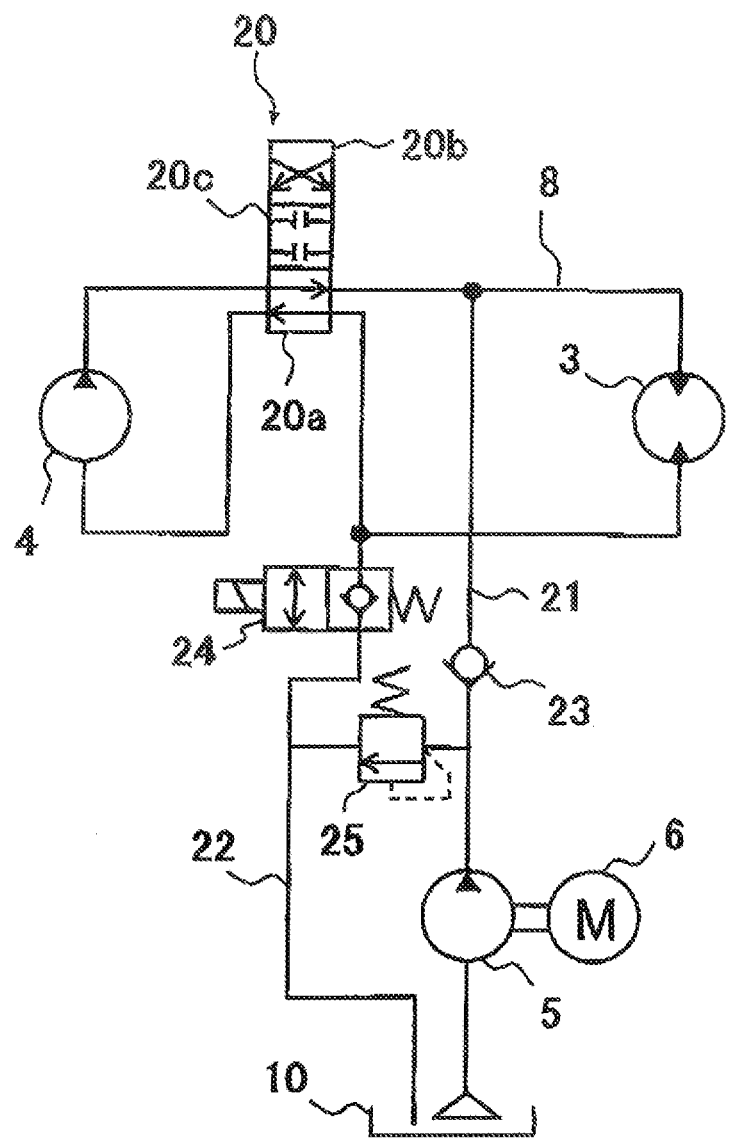
FIG. 4 is a diagram showing a mixer drum driving device in another embodiment.

Further, the configuration of the hydraulic circuit may be as shown in FIG. 4. It should be noted that the configuration of the mixer drum driving device other than the hydraulic circuit such as the engine E, the controller 7, the switch 17, the power supply Bat and the mixer drum M is not shown in FIG. 4.

The hydraulic circuit shown in FIG. 4 is configured to include an auxiliary supply pipe line 21 connecting the side of the pipe line 8 upstream of the hydraulic motor 3 when the hydraulic motor 3 is in positive rotation and the auxiliary hydraulic pump 5, the tank 10, an auxiliary discharge pipe line 22 connecting the side of the pipe line 8 downstream of the hydraulic motor 3 when the hydraulic motor 3 is in positive rotation and the tank 10, a check valve 23 provided at an intermediate position of the auxiliary supply pipe line 21 for permitting only a flow of the pressure oil from the auxiliary hydraulic pump 5 toward the pipe line 8, and an on-off valve 24 provided at an intermediate position of the auxiliary discharge pipe line 22 for opening and closing the auxiliary discharge pipe line 22.

When the mixer drum M is being rotated for mixing and the engine E is in the stopped state, power is supplied to the direct-current brush motor 6 and the auxiliary hydraulic pump 5 is driven and the on-off valve 24 is opened to allow the side of the pipe line 8 downstream of the hydraulic motor 3 when the hydraulic motor 3 is in positive rotation to communicate with the tank 10 via the auxiliary discharge pipe line 22. Then, the pressure oil discharged from the auxiliary hydraulic pump 5 is supplied to the hydraulic motor 3 to set the hydraulic motor 3 in positive rotation and the pressure oil discharged from the hydraulic motor 3 is collected to the tank 10.

By configuring the mixer drum driving device in this way, the auxiliary discharge pipe line 22 is reliably blocked by the on-off valve 24 and the auxiliary supply pipe line 21 is reliably blocked by the check valve 23 while the engine E is driven and the hydraulic motor 3 is driven by the hydraulic pump 4. Thus, it can be reliably prevented that oil leaks from the pipe line 8 side to the tank 10 and becomes insufficient in the pipe line 8 while the hydraulic motor 3 is driven by the hydraulic pump 4.

Further, a relief valve 25 for allowing the pressure oil of the auxiliary hydraulic pump 5 to escape to the tank 10 is provided between the auxiliary supply pipe line 21 and the auxiliary discharge pipe line 22. Thus, an upper limit of the discharge pressure of the auxiliary hydraulic pump 5 is limited to a valve opening pressure of the relief valve 25, whereby an excessive pressure does not act on the hydraulic circuit in the mixer drum driving device and this hydraulic circuit and hydraulic devices provided in the hydraulic circuit such as the hydraulic motor 3 and the auxiliary hydraulic pump 5 can be protected.

It should be noted that although the controller 7 recognizes that the mixer drum M is being rotated for mixing based on the ON-signal from the proximity switch 15 that outputs the ON-signal upon the approach of the select lever 14 when the select lever 14 is located at the position to instruct the mixing mode in the present embodiment, the selection of the mixing mode may be recognized using another sensor. It is also possible to use an operation button or a selection switch instead of the select lever 14.

Furthermore, a weight sensor for detecting the weight of the mixer drum M may be provided on the leg T for supporting the mixer drum M and the direct-current brush motor 6 may be driven to drive and rotate the mixer drum M when the mixer drum M is being rotated for mixing and the engine E is in the stopped state and, in addition, the weight detected by the weight sensor is not smaller than a predetermined weight. If a state where the load such as fresh concrete or cleaning water is carried in the mixer drum M and a state where no load is carried are compared, the mixer drum M carrying the load is heavier. Thus, by setting the predetermined weight at a weight exceeding that of the empty mixer drum M, whether or not any load such as fresh concrete is carried in the mixer drum M can be judged.

In this case, even if it is attempted to rotate the empty mixer drum M for mixing due to an operation error of the operator, useless waste of power due to the drive of the direct-current brush motor 6 while the engine is stopped can be prevented since the weight detected by the weight sensor is below the predetermined weight.

Further, judgment as to whether or not any load such as fresh concrete or cleaning water is carried in the mixer drum M can be also made by detecting a pressure upstream of the hydraulic motor 3 in the pipe line 8 along a flowing direction of the pressure oil in setting the hydraulic motor 3 in positive rotation. If a state where the load is carried in the mixer drum M and a state where no load is carried are compared, a larger torque is required in driving and rotating the mixer drum M in the state where the load is carried. Thus, the pressure of the pressure oil supplied to the hydraulic motor 3 is increased by that much. Therefore, by setting the pressure of the pressure oil when the hydraulic motor 3 is driven in the state where the load is carried in the mixer drum M as a predetermined pressure, whether or not any load is carried in the mixer drum M can be judged.

Further, instead of a pressure sensor, a pressure switch which is turned on at the above predetermined pressure and outputs an ON-signal to the controller 7 may be provided and the controller 7 may judge that the load is carried in the mixer drum M when the ON-signal is input.

The embodiments of the present invention described above are merely illustration of some application examples of the present invention and not of the nature to limit the technical scope of the present invention to the specific constructions of the above embodiments.

The present application claims a priority based on Japanese Patent Application No. 2011-065503 filed with the Japan Patent Office on Mar. 24, 2011, all the contents of which are hereby incorporated by reference.

The invention claimed is:

1. A mixer drum driving device, comprising:
   a mixer drum rotatably mounted on a chassis of a mixer truck;
   a hydraulic motor configured to drive and rotate the mixer drum;
   a hydraulic pump configured to supply pressure oil to the hydraulic motor by being driven by an engine of the mixer truck;
   an auxiliary hydraulic pump configured to supply the pressure oil to the hydraulic motor independently of the hydraulic pump;
   a direct-current brush motor configured to drive and rotate the auxiliary hydraulic pump;
   a detector configured to detect an operation state of the engine;
   a controller configured to drive the direct-current brush motor to drive and rotate the auxiliary hydraulic pump, when the detector detects stop of the engine; and
   a selector configured to select a rotation mode of the mixer drum from a plurality of predetermined rotation modes,
   wherein
   the plurality of the predetermined rotation modes includes;
   a pouring mode in which the mixer drum is set in positive rotation at a prescribed speed;
   a mixing mode in which the mixer drum is set in the positive rotation at a speed lower than the prescribed speed; and
   a discharging mode in which the mixer drum is set in negative rotation, and the controller is further configured to drive the direct-current brush motor to drive and rotate the auxiliary hydraulic pump, only when the selector selects the mixing mode.

2. The mixer drum driving device according to claim 1, further comprising:
   a looped pipe line connecting the hydraulic pump and the hydraulic motor;
   an auxiliary supply pipe line connecting the auxiliary hydraulic pump to a side of the looped pipe line upstream of the hydraulic motor when the hydraulic motor is in positive rotation;
   a tank;
   an auxiliary discharge pipe line connecting the tank to a side of the looped pipe line downstream of the hydraulic motor when the hydraulic motor is in positive rotation; and
   a switching valve having
      a first position where the auxiliary hydraulic pump is connected to the looped pipe line via the auxiliary supply pipe line and the looped pipe line is connected to the tank via the auxiliary discharge pipe line, and
      a second position where the auxiliary hydraulic pump is connected to the tank to return pressure oil discharged from the auxiliary hydraulic pump to the tank without via the hydraulic motor.

3. The mixer drum driving device according to claim 1, further comprising:
   a looped pipe line connecting the hydraulic pump and the hydraulic motor;
   an auxiliary supply pipe line connecting the auxiliary hydraulic pump to a side of the looped pipe line upstream of the hydraulic motor when the hydraulic motor is in positive rotation;
   a tank;
   an auxiliary discharge pipe line connecting the tank to a side of the looped pipe line downstream of the hydraulic motor when the hydraulic motor is in positive rotation;
   a check valve provided at an intermediate position of the auxiliary supply pipe line, the check valve being configured to permit the pressure oil to flow only from the auxiliary hydraulic pump to the looped pipe line; and
   an on-off valve provided at an intermediate position of the auxiliary discharge pipe line, the on-off valve being configured to open and close the auxiliary discharge pipe line.

4. The mixer drum driving device according to claim 3, further comprising:
   a relief valve configured to allow the pressure oil of the auxiliary hydraulic pump to escape to the tank.

5. The mixer drum driving device according to claim 1, further comprising:
   a switch configured to, when the switch is in an ON state, supply power from a power supply to the direct-current brush motor;
   a first switching valve having a disconnecting position at which the hydraulic pump and the hydraulic motor are disconnected; and
   a second switching valve having a connecting position at which the auxiliary hydraulic pump and the hydraulic motor are connected,
   wherein
      the controller configured to, when the selector selects the mixing mode and the detector detects stop of the engine,
      switch the switch into the ON state,
      switch the first switching valve into the disconnecting position, and
      switch the second switching valve into the connecting position.

* * * * *